United States Patent [19]

Cole, Jr.

[11] Patent Number: 4,479,118

[45] Date of Patent: Oct. 23, 1984

[54] POWER OUTAGE INDICATOR

[75] Inventor: Herbert S. Cole, Jr., Scotia, N.Y.

[73] Assignee: General Electric Company, Schenectady, N.Y.

[21] Appl. No.: 348,101

[22] Filed: Feb. 11, 1982

[51] Int. Cl.³ .................................................. G08B 21/00
[52] U.S. Cl. .................................... 340/663; 340/765; 340/784; 350/350 S
[58] Field of Search .............. 340/657, 663, 765, 784; 350/350 S

[56] References Cited

U.S. PATENT DOCUMENTS

| 3,204,193 | 8/1965 | Rhyne, Jr. | 340/663 X |
| 4,196,974 | 4/1980 | Hareng et al. | 350/350 S X |
| 4,346,375 | 8/1982 | Billings | 340/663 X |
| 4,371,870 | 2/1983 | Biferno | 340/784 X |
| 4,385,807 | 5/1983 | Perbet et al. | 350/350 S |

Primary Examiner—James L. Rowland
Assistant Examiner—Daniel Myer
Attorney, Agent, or Firm—Geoffrey H. Krauss; James C. Davis, Jr.; Marvin Snyder

[57] ABSTRACT

A power outage indicator utilizes a smectic liquid crystal display cell, capable of storing information indefinitely, to provide a visual indication, of predetermined form, that power to a given installation has been interrupted. Prior to installation, the smectic liquid crystal display of the power outage indicator is heated and an appropriate voltage placed between the display electrodes to cause the liquid crystal material to align homeotropically, as the liquid crystal material cools to the smectic state; a clear stable texture results. Upon loss of power, stored charge, as in a storage capacitor, is enabled to flow through at least a portion of at least one of the display electrodes, reheating the liquid crystal material therebetween and, upon cooling without an applied field, converts a portion of the liquid crystal layer to a state having differing light-propagation properties than the remainder of the display. The resulting "message" remains visible on the indicator until the indicator is reset by reheating in the presence of an applied field.

20 Claims, 1 Drawing Figure

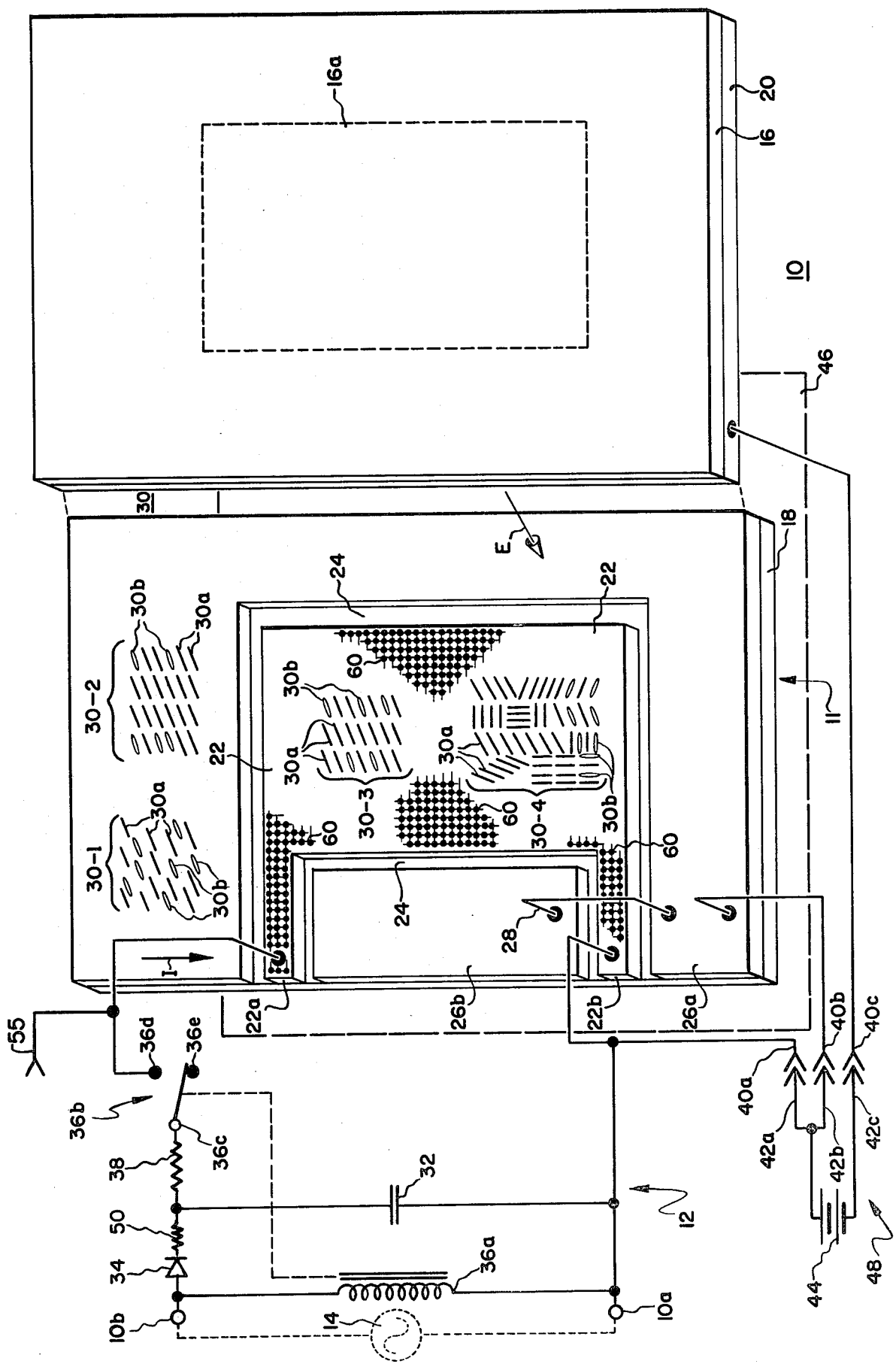

POWER OUTAGE INDICATOR

BACKGROUND OF THE INVENTION

The present application relates to power outage indicators and, more particularly, to a novel power outage indicator utilizing a smectic liquid crystal display cell.

There has been a long standing need for a low cost power outage indicator which can be particularly utilized in locations which are not readily accessible. It is often important to know if power has been interrupted at a location and, in certain instances, there may be time intervals of up to several weeks before monitoring personnel may be able to check a given location. It is preferable that a power outage indicator utilized under such conditions would be highly visible (have a good contrast ratio), exhibit memory phenomena, operate over a broad range of temperatures and be resettable to allow reuse, in addition to having a relatively low cost.

BRIEF SUMMARY OF THE INVENTION

In accordance with the invention, a power outage indicator utilizes a smectic liquid crystal display cell, capable of storing information impressed thereon for an indefinitely long period of time, to provide a visual indication of predetermined form when power to the indicator has been interrupted. The smectic display cell includes a pair of transparent substrates having transparent conductive electrodes deposited on the facing interior surfaces thereof, with at least one of the electrode layers having an indicia pattern formed therein. A quantity of a smectic liquid crystal material is sealed between the substrates. Prior to installation, the display cell is heated and an appropriate voltage is placed between the parallel-disposed electrodes to cause the liquid crystal material to align homeotropically as that material cools to the smectic state, whereby a clear, stable texture results. The indicia-forming electrode is provided with a pair of opposed ends, to enable charge, such as may be stored in a storage capacitor and the like, to flow through that electrode portion upon loss of power. The flow of charge through the electrode portion causes heating in a predetermined area of the cell and raises the temperature of the liquid crystal material therein to the isotropic state. Thereafter, the heated material cools, without the presence of an electric field, and, upon reattaining the smectic state, has a light-propagation property different from the remainder of the display cell. The message portion of the display is visible until the indicator is reset by reheating the smectic liquid crystal material in the presence of an applied field of sufficient magnitude to realign the cooling material into the homeotropic smectic state.

In a presently preferred embodiment of the indicator, the liquid crystal material is host to a guest dichroic dye, whereby the display portion has a visible color difference from the remainder of the display cell upon reheating responsive to a power outage. The current flow responsive to the power outage is provided by a storage capacitor connected through a unidirectionally-conducting element, across power input terminals. The energizing coil of a relay is also connected across the power input terminals, with the relay maintaining an open circuit between the charge storage capacitor and the cell as long as the monitored source of voltage is present. Upon removal of the source voltage, the relay reverts to a normally-closed position, connecting the storage capacitor between opposite terminals of the display electrode portion and temporarily heating that portion to form the viewable indicia.

Accordingly, it is an object of the present invention to provide a novel power outage indicator utilizing a smectic liquid crystal display cell.

This and other objects of the present invention will become apparent upon consideration of the following detailed description, when read in conjunction with the drawings.

BRIEF DESCRIPTION OF THE DRAWING

The sole FIGURE is a partially-schematic view of a power outage indicator in accordance with the principles of the present invention.

DETAILED DESCRIPTION OF THE INVENTION

The sole FIGURE illustrates a power outage indicator 10 in accordance with the invention. Indicator 10 utilizes a smectic liquid crystal display cell 11 and associated means 12 for providing a flow of current through at least a portion of the display cell 11, responsive to an outage of power from a source 14 (shown in broken line) to change a viewable characteristic of the display cell. The changed cell characteristic is prominently viewable, until the display cell is reset.

Display cell 11, itself known to the art and having dimensions somewhat exaggerated for purposes of illustration, has a front substrate 16 of an optically-transparent material, such as glass and the like. A rear substrate 18 is positioned with the plane thereof substantially-parallel to the plane of front substrate 16. Rear substrate 18 may be of optically-transparent material if a transmissive display is to be provided, or may have a reflective coating or other comparable means if a reflective display cell is to be provided. The interior surface of each of substrates 16 and 18 is provided with substantially-transparent conductive electrodes; one of the electrodes is substantially continuously formed over the entire display surface of the associated substrate while the other electrode is formed with at least one indicia-forming portion, surrounded by a background portion. Thus, in the illustrated embodiment, an electrode layer 20 is substantially continuously formed on the interior surface of front electrode 16. An indicia-forming electrode portion 22 is formed upon the interior surface of rear substrate 18, with suitable electrode lead portions 22a and 22b extending from opposite ends thereof. Insulative grooves 24 separate electrode portion 22 from background electrode portions 26a and 26b formed over substantially the remainder of the interior surface of rear electrode 18; the background electrode portions 26a and 26b are electrically-connected by means of a jumper wire 28 and the like. A suitable surface treatment may be utilized at electrodes 20, 22 and 26 to orient molecules of a smectic liquid crystal material 30 in a desired direction, e.g. with homogeneous orientation, in the absence of field E.

The quantity of a smectic liquid crystal material 30 is positioned between the electrode-bearing substrates 16 and 18, and is contained by suitable spacing and sealing means (not shown) disposed substantially about the edges of the display cell 11.

One presently preferred means 12 for providing a flow of current through indicia-forming electrode portion 22 upon removal of connection of the indicator 10 from a power source 14, includes a charge storage element, e.g. storage capacitor 32. One terminal of the storage capacitor is connected to a common display terminal 10a, which is also connected to one lead portion 22b of the indicia-forming electrode portion 22. The remaining terminal of storage capacitor 32 is connected through a unidirectionally-conducting element, e.g. diode 34, to the remaining source input terminal 10b. The energizing coil 36a of a relay means 36 is connected between source terminals 10a and 10b; the associated switching portion 36b of the relay provides: a common terminal 36c, connected through a current-limiting resistor 38 to the junction of capacitor 32 and diode 34; a normally-closed contact 36d connected to the remaining lead portion 22a of the indicia-forming electrode portion 22; and a normally-open contact 36d.

Advantageously, circuit connection means 40, such as plug-in jacks and the like, are provided for resetting the display (as described hereinbelow). Thus, a first jack 40a is provided in electrical connection to the common source terminal 10a and electrode lead portion 22b. A second jack 40b is provided in electrical connection to the electrically-connected background electrode portions 26a and 26b. A third jack 40c is provided in electrical connection to front electrode 20. Jacks 40a–40c are normally open-circuited, but are capable of receiving associated plugs 42a–42c, respectively, when resetting of the indicator is to be carried out. For this purpose, a source 44 of D.C. potential, of a predetermined voltage, has a first terminal connected in parallel to plugs 42a and 42b, with the remaining terminal connected to plug 42c. A heating element 46 (shown in broken line) capable of heating the liquid crystal material at least in the volume defined by the indicia-forming electrode portion 22, from a position external to the exterior surface of either, or both, of front and rear substrates 16 and 18, is provided, along with source 44 and plugs 42, to form a resetting means 48, for use as described hereinbelow.

In operation, display cell 11 is initially set to provide a uniform appearance, when the exterior surface of front substrate 16 is viewed, by heating the entire cell to a temperature greater than the nematic-to-isotropic clearing point temperature. The heat energy required may be provided by heating means 46 and the like. While the cell 11 is in the heated condition, an electric field E of predetermined magnitude is provided between front electrode 20 and the electrically-connected rear substrate electrode portions 22, 26a and 26b, as by connection of source 44 therebetween. When heat energy from source 46 is removed, the liquid crystal material 30 is allowed to cool and enter the nematic state. In the nematic state, responsive to the electric field E between the electrodes, the molecules 30a of the liquid crystal material assume a homeotropic nematic orientation, with the directors of the elongated molecules substantially perpendicular to the electrode planes (as shown in region 30-1). The smectic liquid crystal material may be utilized alone, or as host to a guest dichroic dye; if a guest dichroic dye is utilized, the elongated molecules 30b thereof will also be aligned substantially homeotropically, with directors substantially parallel to the substantially-parallel directors of the liquid crystal molecules 30a. It should be understood that, while the nematic state orientation is shown in region 30-1 with respect to a portion of a background electrode, when the temperature of the cooling cell is in the nematic state temperature region, all of the smectic liquid crystal material in cell 11 is in the nematic phase. Thus, this molecular orientation occurs throughout cell 11, i.e. in portions defined by all of background electrode portions 26a and 26b, and also in the portion defined by indiciaforming electrode portion 22. As the cell continues to cool, the nematic-to-smectic transition temperature is reached and, responsive to further cooling of the cell, all of the liquid crystal material within the cell enters the smectic state. In the smectic state, as illustrated in regions 30-2 and 30-3 (for the background and indicia-forming electrodes, respectively), the liquid crystal molecules 30a, and any guest dichroic dye molecules 30b, form layers of molecules (aligned homeotropically with respect to the surface-alignment-bearing electrode surfaces). As the entire liquid crystal layer 30 is in the smectic state, a stable, non-absorptive (i.e. clear) texture is provided to the cell, whereby a uniform and indicia-less front electrode exterior surface is viewable at the display. The display cell 11 is now initially set and heating means 46 and field-establishing means 44 are removed from the indicator 10.

The clear, stable texture of the display will remain as long as all portions of the display cell remain at a temperature less than the smectic-to-nematic transition temperature. Indicator 10, with initialized display cell 11, is now connected to the source 14 to be monitored. Upon connection of source 14 between indicator terminals 10a and 10b, relay coil 36a is energized, to operate the switch portion 36b thereof such that common terminal 36c is connected to the normally-open terminal 36e. Therefore, an open circuit exists between storage element 32 and the indicia-forming electrode portion 22 of the display cell. Simultaneously with operation of relay means 36, diode 34 allows capacitor 32 to begin storing charge. In the practical application of indicator 10, relay 36 requires some finite time, typically on the order of 10 milliseconds, to effect the connection of common contact 36c to normally-open contact 36e. In order to prevent current flow through electrode portion 22 while the relay is initially moving to its normally-open position, a resistance 50 may be required in series with diode 34, to increase the charging time constant of capacitor 32. Thus, capacitor 32 charges to some predetermined voltage, sufficient to provide a flow of heating current through electrode 22, only after relay 36 has operated and the capacitor is no longer connected to normally-closed contact 36d, at initial connection of the indicator 10 to the associated source 14. It will be seen that source 14, while shown as an A.C. source and therefore requiring an A.C.-operated relay coil 36a specified for the appropriate source voltage, may equally as well be operated with a D.C. supply, if the relay means coil 36a is specified for the appropriate D.C. voltage, and if diode 34 is poled with the proper polarity.

As long as the power source provides energy to indicator terminals 10a and 10b, relay 36 remains energized and prevents connection of capacitor 32 to the indicia-forming electrode portion 22. When a power outage occurs, energy is no longer provided to relay coil 36a and the relay contact section 36b is operated to connect common contact 36c to the normally-closed contact 36d. Storage capacitor 32 is now connected, via resistor 38 and the closed relay contacts, in electrical series connection with indicia-forming electrode 22. Diode 34 now serves to prevent current from flowing through coil 36a from capacitor 32. A current I flows from capacitor 32, into a first one 22a of the electrode leads, through the electrode portion 22 itself, and thence from the remaining electrode portion lead 22b. The magnitude of current I, established by the resistance of current-limiting resistor 38 and by the voltage across capacitor 32, is set to cause the indicia-forming electrode portion 22 to be heated to a sufficient temperature and for sufficient time to raise the associated portion of the liquid crystal layer 30 to a temperature greater than the clearing point temperature, placing that portion of liquid crystal layer 30 in the isotropic phase. When the portion of layer 30 defined by electrode portion 22 begins to cool, responsive to a reduced flow of current I (either because charge has been depleted from storage element 32 or because source 14 is again operative and causes relay 36 to open the current path into electrode portion 22), the cooling liquid crystal material enters the nematic state and then the smectic state. Due to the lack of electric field E (as field-forming-potential source 44 is no longer connected), the molecules in the smectic phase are not aligned in homeotropic layers, but become arranged parallel to one another over small, localized regions. Thus, the multiplicity of regions bounded by electrode portion 22 appears, due to the homeogeneous surface treatment, to be somewhat parallel to the electrode surfaces and with random orientation (as shown in region 30-4), which provides a stable scattering texture which is stored indefinitely. If dye molecules 30b are present in the liquid crystal material, the now-random orientations thereof serve to absorb light over the area defined by electrode portion 22. If dye molecules 30b are not present, the scattering texture of liquid crystal molecules 30a provides a different optical condition in that area 16a (shown in broken line) of the front substrate, when the front of display cell 11 is viewed, relative to the optical condition of the background portion (defined by electrode portions 26) of the display cell. Thus, an area 16a in one optical condition is present, in contrast to the optical condition of the remainder of the front substrate exterior surface, indicating that an outage of power at indicator terminals 10a and 10b has occurred, even if the outage has now cleared and power is again present at terminals 10a and 10b. The visible indicia portion 16a (which may be of any suitable shape desired, by suitable shaping of electrode portion 22) remains until the display is reset.

Resetting of indicator 10 is accomplished by inspection personnel utilizing resetting means 48. The display cell 11 is reheated by heating means 46, with potential source 44 connected, via plugs 42, to provide orientation field E. Once the display cell has been heated beyond the isotropic temperature, heating means 46 is removed while potential source 44 is still connected to the indicator. The liquid crystal material cools through the nematic state (providing the orientations of regions 30-1) to the smectic state, providing the orientations of regions 30-2 and 30-3. The voltage source of the resetting means is now removed and a uniform optical condition is established over the entire viewable surface of the display. Indicator 10 is now ready for re-use in indicating a subsequent power outage.

Resetting means 48 need not have a separate, external heating means 46; heating means 46 can be internal to display cell 11. For example, if a reflective cell is used, rear electrodes 22 and 26 can be a patterned diffuse layer of a high-reflectivity material, such as silver, aluminum and the like. By connection of a suitable current sourcing means (not shown) between a jack 55 and jack 40a, the heating current I can be introduced into electrode portion 22, while field E is applied and, upon removal of the source between jacks 40a and 55, resets the indicator cell. If a transmissive cell is used, a grid or mesh 60 of a high conductivity material, e.g. silver and the like, can be fabricated upon the entire electrode surface (although shown only over a portion thereof, for clarity); preferably, grid 60 is etched to obtain about 60% transmission through the electrode portion 22 - grid 60 structure and may have 10 micron lines on 40 micron centers. The same use of jacks 40a and 55 is made, as hereinabove explained for a reflective cell, to reset the transmissive cell.

While one presently preferred embodiment of my novel power outage indicator has been described in detail herein, many modifications and variation will now become apparent to those skilled in the art. Thus, displays using dichroic dyes can be black and white or colored; transmissive displays can use colored filters, and the like variations can be used to impart desired optical characteristics to the display. It is my intent, therefore, to be limited only by the scope of the appending claims, and not by the specific details and instrumentalities presented by way of explanation herein.

What is claimed is:

1. An indicator for displaying an indication of a power outage of an associated power source, comprising:
   a smectic liquid crystal display cell having a layer of smectic liquid crystal material contained between first and second electrodes; at least one of said first and second electrodes having an indicia forming electrode portion having first and second opposed ends; said cell having the liquid crystal material thereof initially aligned in a first optical condition;
   first and second terminal means for connection to opposite sides of said source; and
   means connected to said terminal means for providing a flow of current through said indicia-forming electrode portion responsive to a power outage of said source to cause that portion of said display cell defined by said indicia-forming electrode portion to change from said first optical condition to another optical condition, with said cell portion remaining in said second condition until said cell is reset; said means comprising: an electrical capacitor, having first and second terminals, for storing electrical charge while said source is operative; a unidirectionally-conducting element coupled between the second terminal means and the first capacitor terminal; a relay having a relay coil connected to said first and second terminal means and across said source, and a relay switching portion having a common terminal and a normally-closed terminal coupled between one end of said indicia-forming electrode portion and said capacitor first terminal, said relay opening the connection between said common and normally-closed terminals when said source is coupled to said terminal means; said electrode portion second end and said capacitor terminal being coupled together to said first terminal means; and a current-limiting resistance connected between said capacitor first terminal and the common terminal of said relay means switching portion.

2. The indicator of claim 1, further comprising a charging current-limiting resistance connected in series with said unidirectionally-conducting element.

3. The indicator of claim 1, wherein said source is a D.C. source, and said unidirectionally-conducting element is poled in accordance with the polarity of said source.

4. The indicator of claim 1, further including means for selectively resetting the display cell to said first optical condition.

5. The indicator of claim 4, wherein said resetting means includes: means for heating at least that portion of said liquid crystal material defined by said indicia-forming electrode portion; and means for providing an electric field between said first and second electrodes at least while said liquid crystal material is cooling.

6. The indicator of claim 5, wherein said heating means includes the indicia-forming electrode portion.

7. The indicator of claim 6, wherein said cell is a transmissive cell; said electrode portion including a grid of a high-conductivity material formed upon a surface thereof.

8. The indicator of claim 1, further including: means associated with the interior surfaces of said first and second electrodes for causing the liquid crystal material to assume a homogeneous orientation in the absence of a field between said first and second electrodes.

9. The indicator of claim 1, wherein the smectic liquid crystal material is host to at least one guest dichroic dye dissolved therein.

10. An indicator for displaying an indication of a power outage of an associated power source, comprising:
a smectic liquid crystal display cell having a layer of smectic liquid crystal material contained between first and second electrodes; at least one of said first and second electrodes having an indicia-forming electrode portion having first and second opposed ends; said cell having the liquid crystal material thereof initially aligned in a first optical condition;
first and second terminal means for connection to opposite sides of said source;
means connected to said terminal means for providing a flow of current through said indicia-forming electrode portion responsive to a power outage of said source to cause that portion of said display cell defined by said indicia-forming electrode portion to change from said first optical condition to another optical condition, with said cell portion remaining in said second condition until said cell is reset; and
means for selectively resetting the display cell to said first optical condition, and including: means for heating at least that porton of said liquid crystal material defined by said indicia-forming electrode portion; and means for providing an electric field between said first and second electrodes at least while said liquid crystal material is cooling.

11. The indicator of claim 10, wherein said heating means includes the indicia-forming electrode portion.

12. The indicator of claim 11, wherein said cell is a transmissive cell; said electrode portion including a grid of a high-conductivity material formed upon a surface thereof.

13. The indicator of claim 12, wherein said grid and said electrode portion have about 60% light transmission therethrough.

14. The indicator of claim 10, wherein said indicia-forming electrode portion has first and second opposed ends; and said current flow providing means includes means for storing electrical charge while said source is operative; and means for connecting said charge storing means between said electrode portion first and second ends only during an outage of said source.

15. The indicator of claim 14, wherein said charge storing means is an electrical capacitor.

16. The indicator of claim 15, wherein said connecting means includes: a relay having a relay coil connected to said first and second terminal means and across said source, and a relay switching portion having a common terminal and a normally-closed terminal coupled between one end of said indicia-forming electrode portion and a first terminal of said storage capacitance, said relay opening the connection between said common and normally-closed terminals when said source is coupled to said terminal means; the electrode portion second end and a second capacitor terminal being coupled together to said first terminal means.

17. The indicator of claim 16, further comprising a unidirectionally-conducting element coupled between the second terminal means and the first capacitor terminal.

18. The indicator of claim 17, further comprising: a current-limiting resistance connected between said capacitor first terminal and the common terminal of said relay means switching portion; and a charging current-limiting resistance connected in series with said unidirectionally-conducting element.

19. The indicator of claim 10, further including: means associated with the interior surfaces of said first and second electrodes for causing the liquid crystal material to assume a homogenous orientation in the absence of a field between said first and second electrodes.

20. The indicator of claim 10, wherein the smectic liquid crystal material is host to at least one guest dichroic dye dissolved therein.

* * * * *